United States Patent [19]

Pechacek et al.

[11] 3,827,839

[45] Aug. 6, 1974

[54] VULCANIZING PRESS FOR RUBBER PRODUCTS

[75] Inventors: Raymond E. Pechacek; Henry J. Clay, both of Houston, Tex.

[73] Assignee: Hahn & Clay, Houston, Tex.

[22] Filed: Mar. 9, 1973

[21] Appl. No.: 339,861

[52] U.S. Cl.................................. 425/34, 425/40
[51] Int. Cl.................................................. B29h 5/20
[58] Field of Search........................... 425/34, 40, 31

[56] References Cited
UNITED STATES PATENTS

| | | | |
|---|---|---|---|
| 1,152,993 | 9/1915 | Thropp................................ | 425/34 |
| 1,191,296 | 7/1916 | Gammeter........................... | 425/40 |
| 1,213,223 | 1/1917 | McLeod............................ | 425/34 X |
| 1,477,879 | 12/1923 | Kilborn et al....................... | 425/40 |
| 1,573,862 | 2/1926 | Raber................................. | 425/34 |
| 2,254,415 | 9/1941 | Boyd et al........................... | 425/34 |
| 3,669,581 | 6/1972 | Mayrer et al...................... | 425/34 |

Primary Examiner—J. Howard Flint, Jr.
Attorney, Agent, or Firm—Pravel, Wilson & Matthews

[57] ABSTRACT

A vulcanizing press for rubber products such as vehicle tires, wherein a plurality of molds for the rubber products are pressed and held together during vulcanization of the rubber products in a steam chamber by a pressure operated ram which has bearing surfaces at its upper and lower ends and an intermediate floating seal therewith for distributing the bearing loads to only two longitudinally spaced areas while maintaining a seal between the ram and the pressure chamber even when the ram is subjected to horizontal or lateral shifting due to temperature changes, loading or other causes. Additionally, a high pressure seal is located at the lower bearing remote from the heat in the steam chamber and where minimum lateral loading occurs and seal clearance is unnecessary. A safety release is provided on the ram to automatically release the pressure on the ram piston when the lateral forces exceed a predetermined amount.

7 Claims, 3 Drawing Figures

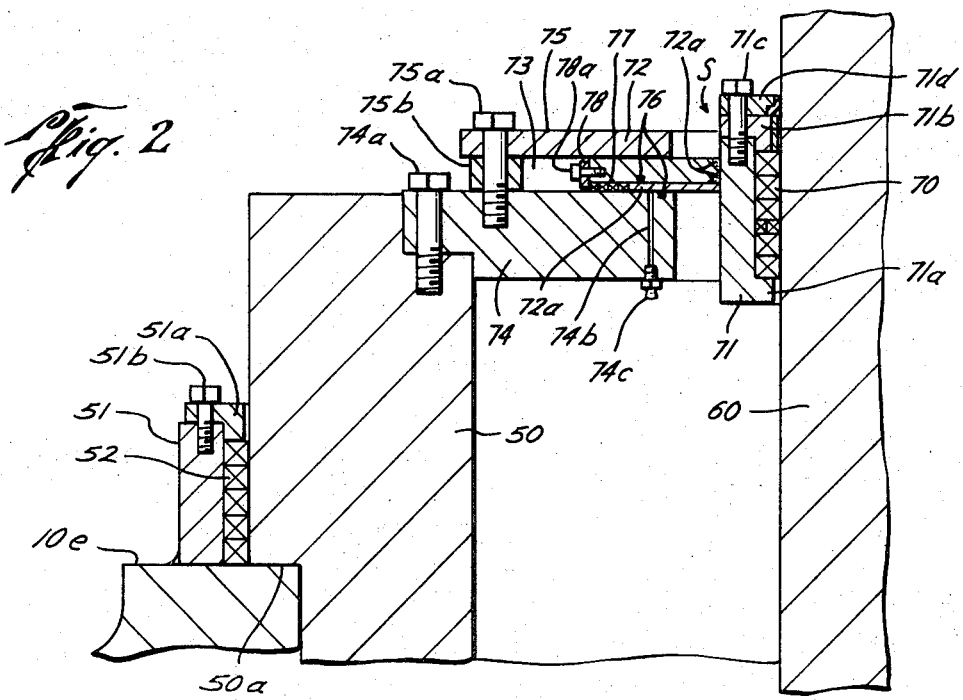
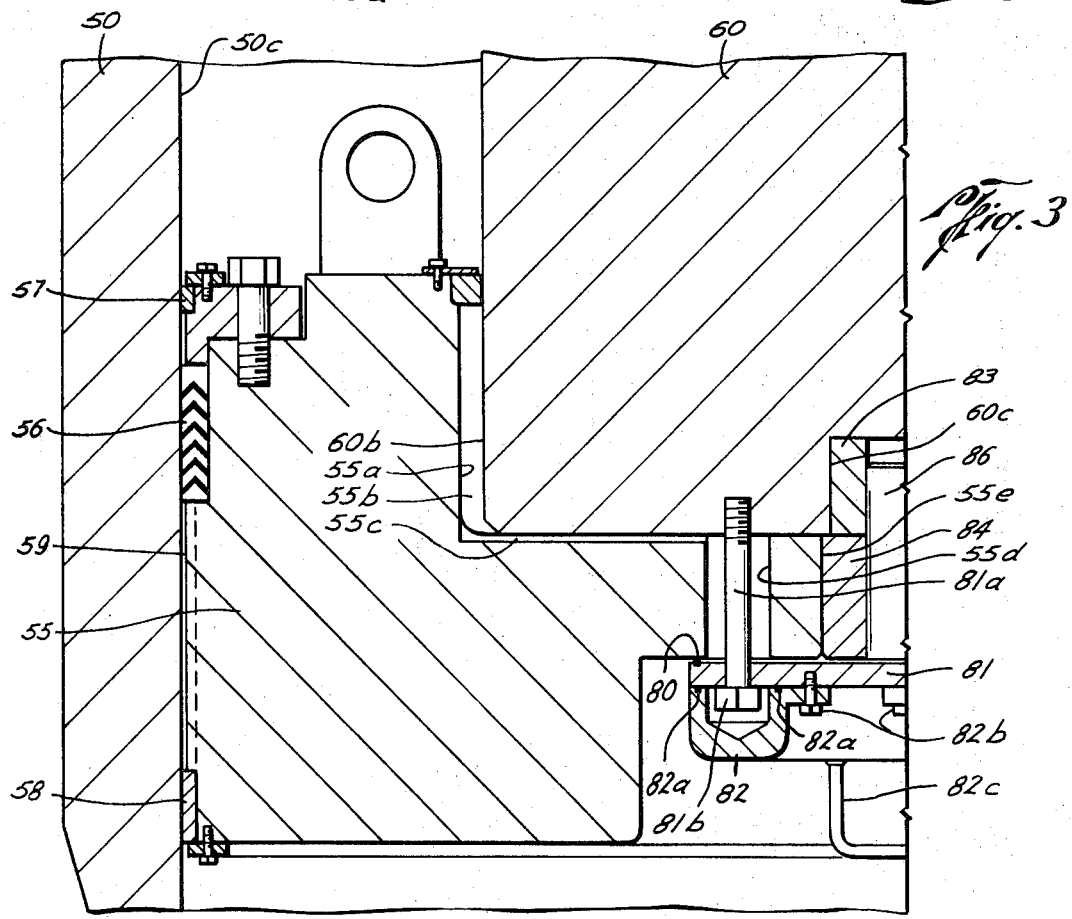

VULCANIZING PRESS FOR RUBBER PRODUCTS

BACKGROUND OF THE INVENTION

The field of this invention is vulcanizing presses for rubber products such as vehicle tires.

In the past, vulcanizing presses for rubber articles such as vehicle tires have been built like the press shown by way of example, in U.S. Pat. NO. 1,118,503. Other examples of tire vulcanizing presses are found in U.S. Pat. Nos. 1,491,020; 1,495,009; and 2,836,847. In the prior apparatus such as shown in U.S. Pat. No. 1,118,503, tire molds were confined in steam chamber or autoclave and pressure was exerted on the molds by the press, using an hydraulic ram. The ram was mounted so that the lateral forces acting thereon were essentially concentrated at the central bushing or area of the ram which resulted in a breakdown of such bushing, as well as the seal therewith. Although it was known for many years that tire press platens could be used outside of steam chambers or autoclaves, with ram supports at each end, as shown in U.S. Pat. No. 1,491,020, the problems of expansion and contraction in a closed steam chamber, and the resultant alignment, binding and sealing problems, has led those skilled in the art to continue with the above-described defective structure for presses with a closed steam chamber for vulcanizing.

SUMMARY OF THE INVENTION

The present invention relates to a new and improved vulcanizing press for rubber articles such as vehicle tires, wherein a movable ram which is adapted to press a plurality of tire molds together during vulcanization, is mounted with support bearings at each end, one in the steam chamber and one in the power cylinder, and with a floating seal between the two support bearings, which seal remains effective without damage thereto even though such seal is subjected to lateral forces due to temperature changes in the steam chamber with resulting expansion and contraction or due to uneven loading of the molds in the press. Additionally, a high pressure seal is located at the lower bearing support remote from said steam chamber where minimum lateral loading occurs and seal clearance is unnecessary. A safety release is provided on the ram to automatically release the pressure on the ram piston when the lateral forces acting on the ram exceed a predetermined amount.

BRIEF DESCRIPTION OF THE DRAWINGS

FIG. 2 is a sectional view taken on line 2—2 of FIG. 1 and illustrating in detail the floating intermediate seal of this invention; and FIG. 3 is a sectional view taken on line 3—3 of FIG. 1 and illustrating details of the safety release means with the piston for automatically releasing the fluid pressure acting on the piston when the lateral loading on the ram in the vicinity of the piston exceeds a predetermined amount.

DESCRIPTION OF THE PREFERRED EMBODIMENTS

Figure 1:
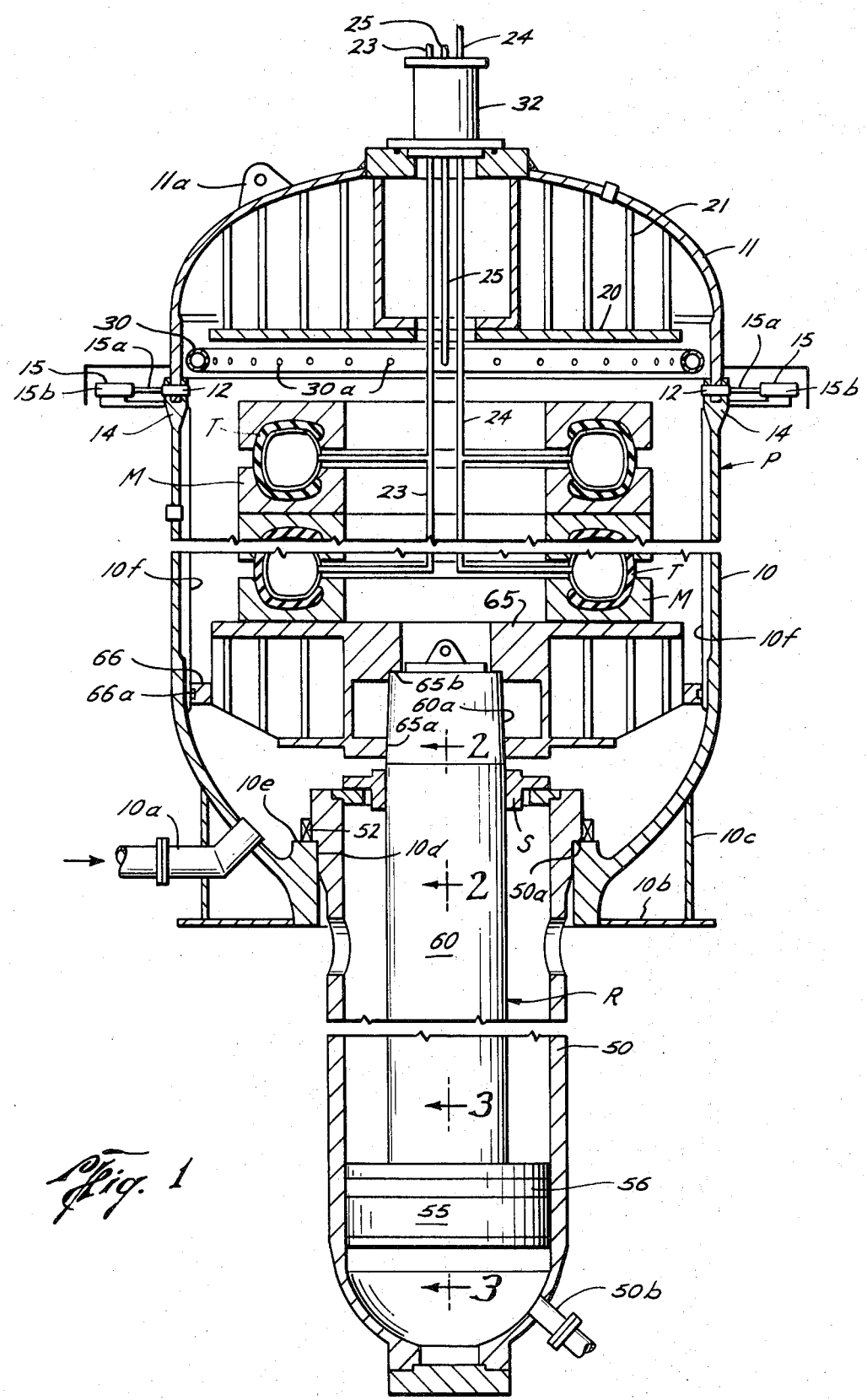
FIG. 1 is a vertical sectional view of the vulcanizing press of the present invention, partly in elevation, and illustrating a plurality of molds for vehicle tires in the press.

In the drawings, the letter P refers generally to the vulcanizing press of the present invention which is particularly suited for vulcanizing or otherwise treating rubber products such as vehicle tires. Broadly, the press P includes a vessel or chamber 10 having a removable cover 11 therewith. A ram R disposed in the chamber 10 and therebelow is used in conjunction with the vessel or chamber P for applying extremely high pressures to a stack of molds which are confined within the chamber 10 where steam or some other heating medium is introduced for vulcanizing or otherwise treating the products which are being vulcanized, cured or otherwise treated in the molds M.

Considering the invention more in detail, the removable cover 11 of the chamber or vessel 10 is releasably connected by a plurality of pins 12 which may be manually inserted and removed from holes in an annular joint 14 between the cover 11 and the portion of the vessel 10 therebelow, or each of the pins 12 may be connected to a small retracting mechanism 15 which is schematically indicated in FIG. 1. Such retracting mechanism 15 may be a hydraulic piston on a piston rod 15a which operates in a cylinder 15b, although any other suitable retracting means may be utilized.

The cover 11 has an upper platen 20, preferably circular shaped, disposed in its upper end with suitable strengthing ribs 21, connected thereto and to the inside of the cover 11 so that such platen 20 is capable of withstanding extremely high pressures thereon without any appreciable distortion. A central opening 20a is provided in the platen 20 through which various tubes such as hoses or tubes 23 and 24 extend for introducing fluid internally of the molds M as illustrated in FIG. 1. Also, opening 20a is adapted to receive a pipe or tube 25 which leads to a spray ring 30 having internal openings or holes 30a therein throughout its full internal circular area for the purpose of spraying cooling water or other liquid into the chamber 10 during the cooling phase of the cycle for the valcanizing of the tires T or other rubber products in the molds M.

The flexible hoses or tubes 23, 24 and the pipe or tube 25 pass through a removable holding and closure assembly 32 which as suitable seal means around the tubes 23, 24 and 25 and such other tubes as may be utilized to prevent the escape of steam or other heating medium from the chamber 10.

The steam or other heating medium is introduced into the chamber 10 through any suitable inlets such as inlet pipe 10a which is connected with a suitable source of steam or other heating medium (not shown).

The vessel or chamber 10 is preferably provided with a base plate 10b which is secured with any suitable cylindrical or other bracing 10c to the external wall of the vessel 10, and such base plate 10b is mounted upon a foundation of concrete, steel or other suitable material (not shown). A central opening 10d in the vessel or chamber 10 is adapted to receive therein a hydraulic or operating cylinder 50 which normally extends down into a pit or other preformed receptacle below the foundation for the base plate 10b. The cylinder 50 may be releasably supported with its upper end in the lower part of the vessel or chamber 10, by positioning an annular shoulder 50a on an annular support at 10e (FIGS. 1 and 2). A packing ring 51 with packing 52 disposed around the external surface of the hydraulic cylinder 50 and compressed therein by a packing gland 51a and a series of adjustable bolts at 51b serves to provide a fluid-tight seal between the vessel 10 and the cylinder 50 (FIG. 2).

The ram R has a piston 55 disposed within the cylinder 50 for actuation by fluid under pressure introduced through a hydraulic fluid line 50b at the lower part of the cylinder 50. As will be well understood by those skilled in the art, hydraulic fluid is supplied through the line 50b from a source (not shown) for actuating the piston 55 to move same within the cylinder 50. The piston 55 has an annular high pressure seal or packing 56 therewith, as well as an upper wiper ring 57, and a lower wiper ring 58, which rings are formed of "Teflon" or similar material. Also, a bearing layer 59 of bronze or similar material is disposed at the external surfaces of the piston 55 by welding or other buildup to provide a suitable bushing or wear surface with the inside of surface 50c of the cylinder 50. The surface 50c may be formed by a stainless steel liner or other similar smooth surface material to facilitate the sliding action of the piston 55 and to reduce wear and corrosion thereof.

A piston rod 60 (FIGS. 1 and 3) is connected to the piston 55 at the lower end of the rod 60, in a manner hereinafter explained. The upper end of the piston rod 60 has a lower platen 65 removably mounted thereon for movement with the rod 60 in response to movements of the piston 55. The upper end of the piston rod 60 is preferably slightly tapered as indicated at 60a for fitting into a receptacle opening 65a and so that a shoulder 65b on the platen 65 rests upon the upper end of the rod 60. Such arrangement permits the removal of the platen 65 from the rod 60 should that become desirable for repairs or replacement purposes, and also for assembly and disassembly purposes.

It should be noted that the platen 65 is disposed for receiving the molds M and it is positioned within the chamber of vessel 10 with a suitable support ring 66 mounted thereon, preferably having a brass ring insert 66a for engagement with vertically or longitudinally extending guide bars 10f which are welded or otherwise formed within the chamber or vessel 10. Such guide bars 10f may be formed of of stainless steel. The ring 66 and the insert 66a have a smaller outside diameter than the inside diameter of the guide bars 10f to provide for unequal expansion of the various parts when subjected to heat during the application of heat to the inside of the chamber 10 and during contraction of the parts when subjected to a cooling of the parts when subjected to a cooling medium such as from the spray tube or ring 30. Because of such variation in the respective diameters of the ring 65, insert 66a and the guide bars 10f there is a lateral or horizontal shifting of the platen 65 within the vessel or chamber 10, which lateral shifting is transmitted to the upper end of the piston rod 60.

A floating seal S is provided for sealing around the upper end of the rod 60 so that when the rod 60 shifts laterally or horizontally, the seal around the rod 60 will be maintained at all times for preventing the escape of the steam or other fluid within the chamber 10. Such shifting laterally of the upper end of the rod 50 may result from an uneven loading of the molds M between the lower platen 65 and the upper platen 20. The sliding seal S (FIG. 2) is preferably mounted at the upper end of the cylinder 50 and in engagement with the external surface of the rod 60. Thus, packing 70 which may be conventional steam packing rings is disposed in contact with the external surface of the rod 60 and such packing 70 is held in position by a packing ring 71 having a lower flange 71a. The packing is compressed by a packing gland 71b which is forced against the packing 70 by a plurality of packing bolts 71c, preferably having an additional ring 71d therewith.

A horizontal guide plate 72 is welded at 72a to the external surface of the packing ring 71 and it extends outwardly therefrom substantially horizontally. The guide plate 72 is preferably circular in configuration and it also has a lower wear plate 72a of brass or some material welded or affixed thereto. The guide plate 72 with its wear plate 72a therewith extends into a guide channel 73 formed by a lower plate 74 and an upper plate 75. The lower plate 74 is attached to the upper end of the cylinder 50 by a plurality of bolts 74a or other suitable securing means. The upper plate 75 is secured to the plate 74 by a plurality of retaining bolts 75a, with a spacer member 75b to provide for the proper spacing for the channel or recess 73.

The plate 72 is sealed with respect to the groove of channel 73 by means of O-rings 76 (FIG. 2). Additional packing 77 is preferably provided to keep condensation from getting to the O-ring seals, and such packing may be held in place and additionally compressed by a suitable retainer 78 having a plurality of bolts 78 therewith. A lubricant such as grease may be introduced to the lower surface of the wear plate 72a by a grease hole 74b and a grease fitting 74c therewith.

In some instances, the alignment of the molds M is not truly vertical and therefore there is side loading or eccentric loading of the molds on the lower platen 65, resulting in very high off-center and horizontal loads acting on the piston rod 60. When such loads do occur, the construction illustrated in FIG. 1 distributes the loads to the upper bearings 66, 66a and also to the lower bearing 59 so that the load is spaced at both ends of the rod 60 and there is no tendency for the rod to pivot about a single bearing load area as in the prior art. The floating seal S accomplishes the seal around the piston rod 60 even though there is such distribution of the bearing forces to the upper and lower end areas of the ram R.

Additionally, in some instances the bearing loads in a horizontal or lateral direction acting on the lower end of the ram R in the vicinity of the piston 55 reach such extremes due to the eccentric loading of the molds M, or due to other causes, that the apparatus would be damaged. To prevent such damage and to stop the fluid pressure from acting on the piston 55 automatically when the lateral forces on the piston rod in the vicinity of the piston 55 reach excessively high amounts, the construction particularly illustrated in FIG. 3 of the drawing is provided.

As previously explained, the high pressure hydraulic fluid for moving the piston 55 is confined within the lower end of the cylinder 50 which, significantly, is in close proximity to the main high pressure seal 56 so that such seal 56 is not subjected to the extreme temperatures and the changes resulting therefrom, which are encountered in the vicinity of the chamber 10.

The piston 55 is formed with a pocket 55a for receiving the lower end of the piston rod 60 (FIG. 3), and the inside diameter of such pocket 55a is greater than the outside diameter of the main surface 60a of the piston rod 60. This provides for an annular passage 55b between the piston surface 55a and the external surface 60a of the piston rod 60. Such channel 55b is in communication with the plurality of radial channels 55c formed in the base of the pocket 55a and which communicate with a vertical opening or openings 55d. The opening or openings 55d would be exposed to the hydraulic fluid acting on the piston 55 so that such fluid could flow through the radial passages 55c and then upwardly through the annular passage 55b for relieving the pressure acting on the piston 55. However, during the normal operations, the opening or openings 55d are closed off by an annular seal ring 80 is carried by a seal ring plate 81, held in position and secured to the lower end of the piston rod 60 by a plurality of bolts 81a. The bolt heads 81b are sealed off by an annular cap 82 which has spaced O-rings 82a in sealing contact between the cap 82 and the plate 81. The cap 82 is held on the plate 81 by suitable bolts 82b or other suitable securing means. The handle 82c is preferably provided for positioning the cap 82 over the bolt heads 82b.

The piston rod 60 has a recess 60c which is adapted to receive a bushing 83 in alignment with a bushing 84 in a central hole 55e in the piston 65. A shear pin 86 is positioned within the bushings 83 and 84 and forms a tight fit therewith.

When the lateral loads on the lower end of the piston rod 60 are sufficient to shear the pin 86, the lower end of the piston rod 60 may move laterally or horizontally relative to the piston 55, causing the bolts 81a and the plate 81 therewith to shift laterally to thus move the seal ring 80 over with respect to the vertical port or ports 55d sufficiently to allow the hydraulic fluid to flow through the port or ports 55d and then to the radial passage 55c and the vertical annular passage 55b, thus relieving the full pressure acting on the piston 55 so as to prevent further movement of the piston 55 automatically.

In the operation or use of the apparatus P of this invention, for the purpose of vulcanizing or subjecting products such as vehicle tires to various heat and cooling cycles, the piston 55 is initially in its lowermost position shown in FIG. 1 so that the lower platen 65 is near the lower end of the vessel of chamber 10.

The pins 12 are removed and the cover 11 is lifted, using any suitable type of equipment (not shown) preferably engaging the bracket 11a. Prior to such lifting of the cover 11, the sealing closure 32 is preferably removed or steps and otherwise taken so that the flexible tubes 23 and 24 can be inserted therethrough for subsequent connection to molds M.

The molds M are positioned on the lower platen 65 and are stacked with the unvulcanized tires T or other products in the molds M. The connections are made with the flexible holes or lines 23 and 24 or any other suitable source of hot fluid for inflating the internal portion of the molds M as is well understood by those skilled in the molding art. The flexible lines 23 and 24 are fed through the bonnet or closure 32 in any suitable manner known to those skilled in the art and they are sealed off in the closure 22. The cover 11 is then positioned on the vessel 10 and the pins are inserted as shown in FIG. 1. Thereafter, the piston 55 is urged upwardly by hydraulic fluid introduced through the pressure line 50b so as to confine the molds M between the lower platen 65 and the upper platen 20 under high pressure so that during the vulcanization, the molds M will remain fixed between the platens 20 and 25 even though they are subjected to substantial internal pressures during the vulcanization.

The steam or other fluid is introduced for the vulcanization through the inlet line 10a so as to heat the inside of the vessel or chamber 10 to accomplish the heating of the mold and the rubber products T therein. The pressure on the molds M is maintained by the hydraulic fluid acting on the piston 55 during the vulcanization. It is to be noted that the seal 56 is remote from the heat of the vulcanization chamber 10 and is in proximity to the cool hydraulic fluid so that the life of such seal 56 is materially increased as compared to the prior art seals which were located in proximity to the heat of the vulcanization chamber.

As previously explained, if there is lateral of horizontal shifting of the piston rod 60 due to eccentric loading of the molds M or due to temperature changes in the chamber 10, the sliding or floating seal S maintains a fluid seal to keep the hot fluid within the chamber 10 even though the rod 60 shifts laterally or horizontally.

After the heating cycle has been completed it is usually desirable to spray cooling water or other liquid into the chamber 10 through the spray ring 30 which is connected to the pipe 25 and in which is in turn connected to a supply of water or other cooling fluid. Such cooling usually occurs prior to releasing the pressure on the piston 55, and then, the pressure of the hydraulic fluid on the piston 55 is relieved so that the piston 55 moves downwardly by the weight of the molds M on the platen 65 and by gravity, thus returning the piston 55 to the lower position shown in FIG. 1. Thereafter, the pins 12 are removed, the cover 11 is again removed and the molds M are lifted or otherwise taken from the chamber 10. The process is then repeated in the known manner for further vulcanization or treatment of products with the apparatus P.

The foregoing disclosure and description of the invention are illustrative and explanatory thereof, and various changes in the size, shape, and materials as well as in the details of the illustrated construction may be made without departing from the spirit of the invention.

We claim:

1. A vulcanizing press for products of vulcanizable material, comprising:

a closed chamber having an upper platen mounted therein for engagement by the uppermost mold in a stack of molds for vulcanizable products;

means for introducing a heating medium into said chamber;

a ram including a lower platen disposed in said chamber and adapted to receive said stack of molds thereon;

said ram also including a piston rod connected to said lower platen and extending therebelow, and a piston on the lower end of said piston rod;

a ram cylinder below said chamber in which said piston is slidably disposed;

means for supplying fluid pressure in said ram cylinder below said piston for moving same to apply pressure on said lower platen to thereby apply pressure to said stack of molds between said lower platen and said upper platen;

upper bearing support means between said lower platen and the wall of said chamber for providing lateral bearing and support for said ram at its upper and for resisting lateral loading thereon;

lower bearing support means between said piston and the wall of said cylinder for providing lateral bearing and support for said ram at its lower end for resisting lateral loading thereon; and an intermediate laterally floating seal means between said piston rod and the lower part of said chamber for sealing off the heating medium within said chamber and for maintaining the seal when said piston rod shifts laterally relative to a fixed support with said chamber.

2. The press set forth in claim 1, wherein said floating seal means includes:

a packing ring adapted to surround said rod with an annular space therebetween;

packing in said annular space of said packing ring from forming a fluid-tight seal with said rod;

guide means connected with said packing ring and said fixed support externally thereof for permitting lateral movements but preventing longitudinal movement, of said packing ring and the packing therewith relative to said fixed support.

3. The structure set forth in claim 2, wherein said guide means includes:

an annular guide groove formed with said fixed support; and an annular guide plate with said packing and extending externally therefrom into said guide groove for lateral sliding movement in said groove.

4. The structure set forth in claim 3, including:

seal means between said guide plate and the wall of said guide groove for sealing therebetween at all times including during lateral sliding of said guide plate in said groove.

5. The press set forth in claim 1, including:

a high pressure seal with said piston in said cylinder disposed externally of said chamber for sealing off the high pressure fluid in said cylinder acting on said piston.

6. A vulcanizing press for products of vulcanizable material, comprising:

a closed chamber having an upper platen mounted therein for engagement by the uppermost mold in a stack of molds for vulcanizable products;

means for introducing a heating medium into said chamber;

a ram including a lower platen disposed in said chamber and adapted to receive said stack of molds thereon;

said ram also including a piston rod connected to said lower platen and extending therebelow, and a piston on the lower end of said piston rod;

a ram cylinder below said chamber in which said piston is slidably disposed;

means for supplying fluid pressure in said ram cylinder below said piston for moving same to apply pressure on said lower platen to thereby apply pressure to said stack of molds between said lower platen and said upper platen;

upper bearing support means between said lower platen and the wall of said chamber for providing lateral bearing and support for said ram at its upper end for resisting lateral loading thereon;

lower bearing support means between said piston and the wall of said cylinder for providing lateral bearing and support for said ram at its lower end for resisting lateral loading thereon; and a safety release means with said piston for automatically releasing the fluid pressure acting on the piston when the lateral forces acting on the ram at the piston are greater than a predetermined amount to thereby prevent the application of further pressure on said stack of molds.

7. The structure set forth in claim 6, wherein said safety release means includes:

passage means through said piston from the pressure side to the other side;

closure means connected to said piston rod and covering said passage means, but movable with said piston rod relative to said piston and said passage means for opening said passage means for flow therethrough; and shearable connector means between said piston rod and said piston adapted to be sheared when said predetermined lateral force is exerted on the ram at the piston for thereby permitting lateral movement of said piston rod and said closure means therewith relative to said piston and said passage means for automatically releasing fluid pressure through said passage means.

* * * * *